United States Patent

Schreiter et al.

[11] Patent Number: 5,971,472
[45] Date of Patent: Oct. 26, 1999

[54] WIND DEFLECTOR FOR VEHICLE ROOF OPENING

[75] Inventors: Thomas Schreiter; Michael Hanke, both of München, Germany

[73] Assignee: Webasto Karosseriesysteme GmbH, Stockdorf, Germany

[21] Appl. No.: 08/932,381

[22] Filed: Sep. 17, 1997

[30] Foreign Application Priority Data

Oct. 19, 1996 [DE] Germany .......................... 196 43 234

[51] Int. Cl.⁶ ............................................ B06J 7/22
[52] U.S. Cl. .................... 296/217; 16/307; 16/308
[58] Field of Search .................. 296/180.3, 217; 16/256, 257, 285, 307, 308

[56] References Cited

U.S. PATENT DOCUMENTS

| | | | |
|---|---|---|---|
| 495,966 | 4/1893 | Ennis | 16/307 |
| 3,711,150 | 1/1973 | Perks | 296/137 |
| 3,922,032 | 11/1975 | Schaller | 296/137 |
| 4,291,912 | 9/1981 | Fox et al. | 296/217 |
| 4,630,859 | 12/1986 | Beinert et al. | 296/217 |
| 4,662,671 | 5/1987 | Davis | 296/217 |
| 4,705,316 | 11/1987 | Jardin et al. | 296/217 |
| 5,018,782 | 5/1991 | Fiegel et al. | 296/217 |
| 5,052,745 | 10/1991 | Preiss | 296/217 |

FOREIGN PATENT DOCUMENTS

| | | |
|---|---|---|
| 31 00 731 | 12/1981 | Germany . |
| 31 37 191 | 3/1983 | Germany . |
| 2 079 697 | 1/1982 | United Kingdom . |

*Primary Examiner*—D. Glenn Dayoan
*Assistant Examiner*—Paul Chenevert
*Attorney, Agent, or Firm*—Sixbey, Friedman, Leedom & Ferguson; David S. Safran

[57] ABSTRACT

A wind deflector for reducing noise at a vehicle roof opening has a wind deflector blade (1) which is pivotally mounted by at least one pivot bearing to pivot about a pivot axis C extending crosswise to the direction of travel. The pivot bearing has two partial bearing shafts (6, 7) which are spaced apart axially on a longitudinal edge (8) of the wind deflector blade and are mounted in bearing blocks (12, 13) on the roof which, for axial insertion of the partial shaft (6, 7), are open at their respective axial ends and are closed at the opposite ends (14, 15) for axial supporting of an end of the partial shafts (6, 7). Between the two partial shafts (6, 7) there is a coil spring (16) which is biased at one end on a first spring housing (17) fixed to the roof in the region of a first partial shaft (6) and at the other end on a second spring housing (18, 19) on the wind deflector blade side in the region of the second partial shaft (7).

12 Claims, 1 Drawing Sheet

WIND DEFLECTOR FOR VEHICLE ROOF OPENING

BACKGROUND OF THE INVENTION

1. Field of the Invention

The present invention relates to a wind deflector.

2. Description of Related Art

Vehicles such as cars or automobiles are often provided with a sunroof in the form of a vehicle roof opening and a sliding or folding roof panel or a louvered roof opening, for example. It is well known that variously loud noise occurs at the front edge of vehicle roof openings according to the traveling speed and degree of opening. Therefore, it has been found expedient to provide on the front edge of the roof opening a wind deflector which in its working position is directed obliquely upwardly in the direction of travel and deflects upwardly the air passing over the vehicle roof, so reducing noise and furthermore preventing an undesired and violent draught of air in the interior of the car. The wind deflector in question is preferably mounted in pivotal manner close to the front edge of the roof opening in such a way as to pivot about a pivot axis extending crosswise to the direction of travel, being preferably resiliently pretensioned into its working position and is furthermore provided with a restoring means which, upon closure of the vehicle roof opening, tilts the wind deflector back into its inoperative position for example through the sliding roof.

The construction of the pivot bearing for the wind deflector or wind deflector blade is problematical for various reasons. For example, there is known from German Patent Application DE-A-3100731 a wind deflector of the type indicated above, the pivot bearing of which is connected in the manner of a multi-part hinge rigidly to the roof frame and is also rigidly connected to the wind deflector, accommodating an integral bearing shaft. This pivot bearing, which furthermore comprises a leg spring for automatic pivoting of the wind deflector into the working position, is of relatively complicated construction and requires complicated assembly stages which provide, among other things, for screwing the two pivot bearing parts to the wind deflector or roof frame respectively.

Furthermore, it is known for the pivot bearing in question to be connected to the wind deflector and the roof frame by a clip connection. The disadvantage of a clip connection however is that it cannot accept such a high loading as the aforementioned hinged bearing. Another disadvantage with a clip connection is that it only permits a limited choice of material. Finally, a clip connection permits only a relatively coarse production tolerance for the pivot bearing. It has already been attempted to overcome the problems underlying the pivot bearings for wind deflectors by using a lifting mechanism instead of a pivot bearing. However, this requires a very complicated construction and also special sealing measures. Corresponding wind deflector constructions are known for example from UK Patent 20079 697 and German Patent DE 31 37 191 C2.

SUMMARY OF THE INVENTION

The present invention is based on the problem of providing a wind deflector of the generic type but which is of favorably priced, reliable and easily installed pivot bearing design.

According to the invention, there is provided a wind deflector for reducing noise at a vehicle roof opening, the deflector comprising: at least one wind deflector blade pivotally mounted by means of a pivot bearing for pivoting about a pivot axis, the pivot bearing comprising at least two aligned partial bearing shafts which are spaced apart axially on a longitudinal edge of the wind deflector blade for mounting in bearing blocks which in use are fixed to a vehicle roof and which are open at one axial end for axial insertion of the partial shafts and closed at the opposite end for axial supporting of an end of the partial shafts; and, biasing means between the two partial shafts which at one end is mounted on a first housing fixed in use to a vehicle roof in the region of the first partial shaft and at the other end on a second housing in the region of the second partial shaft.

While the pivot bearings according to the state of the art use continuous or one-piece bearing shafts which require a correspondingly expensive installation, the present invention provides a pivot bearing based on at least two separate aligned axially spaced apart bearing shafts and, provided for these partial shafts, at least two bearing blocks which are axially open at one end and close the other end. By reason of the divided construction of the pivot bear according to the invention, with bearing elements aligned in respect of each other and with biasing means for separable permanent connection of the pivot bearing elements to each other, then not only is a simply constructed and reliably functioning pivot bearing obtained but also an extremely simple installation requiring neither tools nor fixing parts such as screws.

In the preferred embodiment, installation is confined to applying the wind deflector blade to the bearing points on the roof opening, pushing the biasing means onto the housings at this location, the biasing means being pre-mounted on a housing on the wind deflector blade, and so displacing the wind deflector blade in its longitudinal direction or in the direction of the pivot bearing axis such that the partial bearing shafts assume a position in front of the axially open ends of the bearing blocks. At that position, by releasing the wind deflector blade, the partial shafts enter the bearing blocks so that the pivot bearing according to the invention is made ready. Dismantling of the wind deflector is possible in a similarly simple way in that the installation stages referred to briefly hereinabove and explained in greater detail hereinafter are carried out in reverse order, starting with a displacement of the wind deflector blade parallel with the pivot bearing axis in such a way that the partial bearing shafts are capable of emerging from their bearing blocks.

Advantageously, the first housing is provided at the closed end of one first bearing block for the first partial shaft while the second housing is formed on the second partial shaft which is mounted in the other second bearing block. The result is a particularly compact construction of the pivot bearing which is particularly suitable for an injection molding process and particularly advantageous for wind deflector blades of small overall size of which, for adaptation to a curved and/or convex front edge of a roof opening, preferably a plurality may be disposed independently of but next to one another.

According to a further and advantageous development of the invention, the housings comprise aligned axially spaced apart guide journals for the ends of the biasing means and radial bracing surfaces on which the ends of the biasing means are biased. Thus, reliable guidance of the biasing means in both radial and axial directions is guaranteed. Constructing the housings in cup form additionally, at assembly, allows a problem-free application and reliable fixing of the biasing means on the housings. To promote easy manufacture and a compact construction, the guide journals of the housings are preferably aligned with the partial shafts, although basically also a laterally offset disposition of the guide journals in relation to the partial shafts would fulfil their functional purpose.

The aforementioned axial bearing surfaces for the biasing means on the guide journals are in the case of the first guide journal preferably formed by the outside of the closed bearing block end and in the case of the second guide journal by a shoulder or ring or a step formed thereon. For ease of manufacture, it is also preferable for the second partial shaft and the associated second guide journal to be formed as a common shaft, the axial bracing surface being in the form of a shoulder or ring or a step formed on this common shaft.

In order to minimize tool costs, the bearing blocks are advantageously formed from two axially offset radially divided bearing shells. In this respect, no push members are required in the tool. Furthermore, the biasing means may be a coil spring which is advantageously constructed as a leg spring, the legs of which are pre-tensioned at one end on a roof frame construction and at the other on the wind deflector in order to permit an automatic pivoting of the wind deflector into its working position.

Preferably, the constituent parts of the pivot bearing according to the invention are injection moldings, the partial shafts and spring housings being formed in one piece with the wind deflector blade while the bearing blocks are formed in one piece with the roof frame construction.

An embodiment of the present invention will now be described by way of example with reference to the accompanying drawings.

DETAILED DESCRIPTION OF THE PREFERRED EMBODIMENTS

The wind deflector of the present invention serves to reduce noise at a vehicle roof opening O, for example a sliding roof opening or a push-out type of roof opening.

The disposition of such a wind deflector at the front edge of the roof opening, about a pivot axis extending crosswise to the direction of forward travel F, is known in many forms of construction and will not be described in detail herein. Reference may be made for example to the documents mentioned above which show corresponding disposition geometries.

Figure 1:
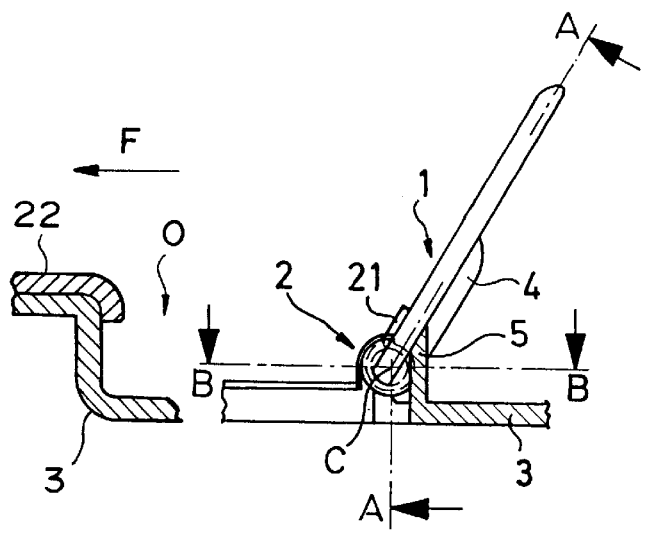
FIG. 1 shows a cross-sectional view through an example of a wind deflector according to the invention fitted close to the front edge of the roof opening of a motor vehicle.

The invention relates primarily to the construction of the pivot bearing of such a wind deflector and thus the drawings only show the wind deflector with the pivot bearing and without the periphery of the roof, only the portion of the fixed roof surface 22 at the front edge of the roof opening O being shown in FIG. 1.

A one-piece wind deflector or wind deflector blade of a multi-part wind deflector of generally rectangular form is connected by a pivot bearing 2 to a roof frame 3 of a motor vehicle and is fixed in the region of a roof opening O on the bodywork of the vehicle. The disposition of the wind deflector 1, pivoted into its working position, and its pivotable mounting can be seen in the cross-sectional drawings in FIGS. 1 and 5. In the case of a relatively large wind deflector blade or wind deflector 1, it is possible instead of the single pivot bearing 2 which is shown to use a plurality of such pivot bearings which will be axially offset in respect of one another. If necessary, the wind deflector blade 1 can be reinforced by vertical ribs 4.

Figure 5:
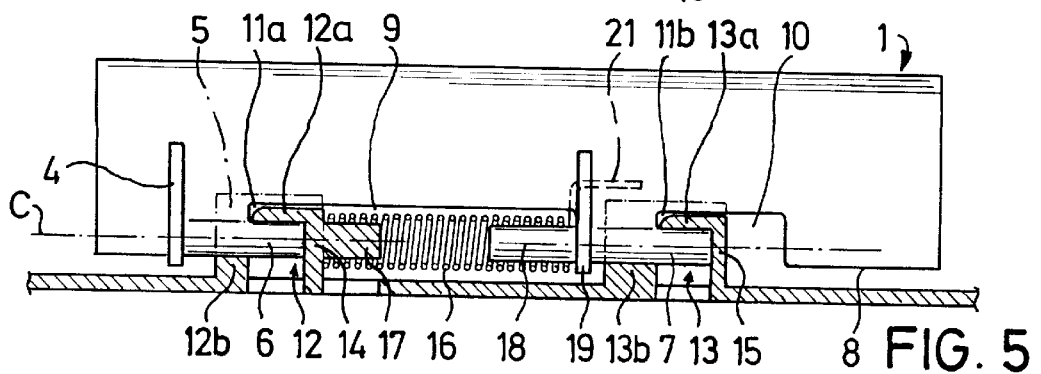

The pivoted-open operating position of the wind deflector blade 1 as shown in FIGS. 1 and 5 is fixed by an arresting means which in the case of the embodiment shown is formed by an abutment 5 provided or integrally formed on the roof frame part of the pivot bearing 2. As explained in greater detail hereinafter, the wind deflector blade 1 is held by a spring force in the operating position shown in FIGS. 1 and 5. In a manner known from U.S. Pat. No. 4,630,859 the wind deflector blades can be moved (in the direction of the broken line arrow in FIG. 1) by operative connection to the sliding roof or push-out roof cover into its flush position when it is lowered into a transverse part of the frame at the front edge of the sliding roof opening and also moved from this position and returned to the operating position.

The construction of the pivot bearing 2 will be explained in greater detail hereinafter with reference to FIGS. 1 and 5.

The pivot bearing 2 consists of a fixed portion preferably connected in one piece to the wind deflector blade 1 and a bearing portion which is rigidly and preferably connected in one piece to the roof frame 3. In contrast to conventional pivot bearings for wind deflectors with one-piece bearing shafts, the pivot bearing 2 according to the invention has a two-piece bearing shaft, namely a first partial shaft 6 and a second partial shaft 7 which are aligned with and axially spaced apart from each other. The two partial shafts 6,7 are preferably formed in one piece with a longitudinal edge 8 of the wind deflector blade 1. The partial shafts 6,7 are flush with the contours of the edge of the longitudinal edge 8 of the wind deflector blade 1, i.e. they extend within the wind deflector blade 1 and parallel with this edge within a first recess 9 (partial shaft 6) or a smaller second recess 10 (partial shaft 7) in the wind deflector blade 1. In the first recess 9, between the partial shaft 6 and the adjacent inner wind deflector blade portion there is a first clear space 11a. A similar second clear space 11b is disposed between the partial shaft 7 and the adjacent inner wind deflector blade portion in the second recess 10.

The pivot bearing portion on the roof frame side is basically complementary to the portion on the wind deflector blade side and comprises a first bearing block 12 and a second bearing block 13 which are aligned with each other axially and with the partial shafts 6,7 while being spaced apart axially. The bearing blocks 12,13 each have an axially open end and an oppositely disposed axially closed end 14,15 and the two bearing blocks 12,13 are relatively identically orientated, i.e. their open ends point in the same direction which is the left-hand direction in FIG. 5. Each bearing block 12, 13 is divided radially into two axially offset bearing shells 12a, 12b, 13a, 13b. Each of the bearing shells 12a, 12b, 13a, 13b has inner partially cylindrical bearing surfaces for the pivotable mounting of the respective partial shaft 6, 7 which are introduced into and from the open sides of the bearing blocks 12, 13, the inner end faces of the partial shafts 6, 7 bearing on the oppositely disposed end face of the respectively closed bearing block end 14, 15. The partial bearing shells 12a, 12b, 13a, 13b provide the least possible bearing friction in respect of the partial shafts 6, 7.

The bearing shafts 6, 7 and therefore the wind deflector blade 1 are held axially in position in the bearing blocks 12, 13 by a coil spring 16 which is axially pre-tensioned and aligned with the pivot axis C of the pivot bearing 2.

The coil spring 16 has its axial ends seated on axially aligned guide journals 17, 18 which are spaced apart from each other axially. The first guide journal 17 is rigidly connected to the closed end 14 of the first bearing block 12 and is preferably integral therewith and has its free end orientated towards the free end of the oppositely disposed second guide journal 18. The second guide journal 18 is rigidly connected to the wind deflector 1 and in the preferred embodiment shown it forms a common shaft part with the second bearing shaft 7. Provided on this common shaft part or in the zone of connection of the guide journal 18 with the second partial shaft 7 is a radially extending ring or collar 19 of which the annular surface facing the first guide journal 17 forms an axial support for the coil spring 16. A support for the other end of the coil spring 16 is formed in the zone of transition between the first guide journal 17 and the closed end 14 of the first bearing block 12.

Figure 2:
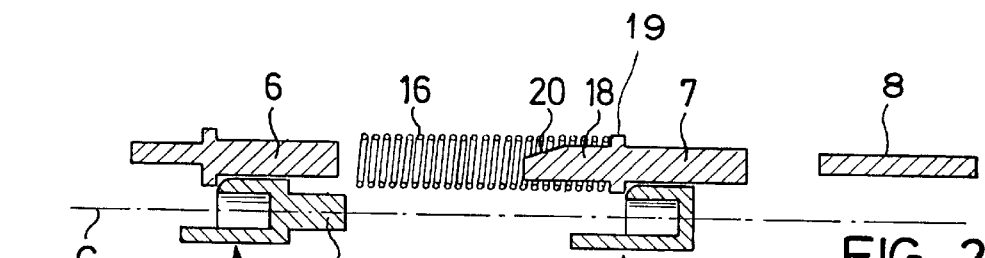
FIGS. 2 to 4 are sectional views of the wind deflector of FIG. 1 taken on the line B—B to illustrate the stages by which the wind deflector is installed; and, FIG. 5 shows a sectional view taken on the line A—A of FIG. 1.
Figure 3:
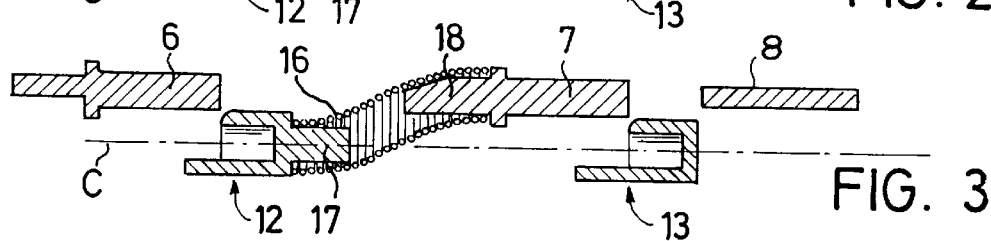
Figure 4:
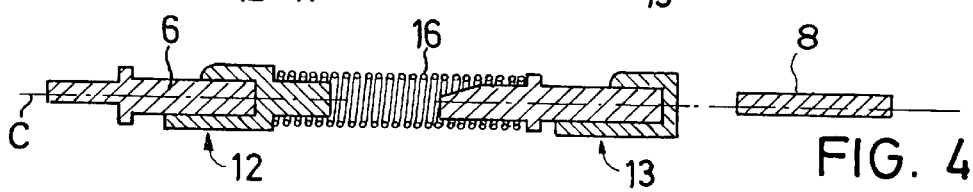

As can be seen in FIG. 5, in the assembled state, the coil spring 16, which is subject to an initial axial compression, presses the ends of the two partial shafts 6, 7 against the supporting surfaces of the closed bearing blocks 12, 13 so providing for a permanent but if necessary separable connection of the wind deflector blade 1 with the vehicle bodywork roof or roof frame 3. The procedure for producing this separable connection can best be ascertained from the installation sequence of the wind deflector blade pivot bearing which is shown diagrammatically in FIGS. 2 to 4. In FIGS. 2 to 4, the pivot bearing parts are shown without the roof frame in order to demonstrate the method of installation more clearly.

It can be seen from the cross-sectional views in FIGS. 2 to 4, taken on the line B—B in FIG. 1, that the second guide journal 18 has an inclined surface 20 (or alternatively a cone) which extends downwardly towards the free end of this journal 18 and which serves to facilitate installation, as will become clear from the following.

Furthermore, in a manner not shown, this second guide journal 18 preferably has a radially thickened part by which, at the beginning of installation which is shown in FIG. 2, the coil spring 16 is reliably secured on this journal 18.

As FIG. 2 also shows, the gap between the partial shafts 6, 7 is chosen so that the initially relaxed coil spring 16 pushed onto the second guide journal 18 so that it bears against the ring 19 can manually and without difficulty be pushed onto the first guide journal 17 to bear against the bearing surface in the transition zone to the closed end 14 of the first bearing block 12. This deflection of the coil spring 16 from its extended linear state into a slightly S-shape or lazy Z-shape state is facilitated by the inclined surface 20 on the free end of the second guide journal 18.

As FIG. 3 shows, the wind deflector blade 1 which is in the position shown in FIG. 2 is so displaced in the direction of the pivot axis C that the gap between the free ends of the guide journals 17, 18 is reduced as the coil spring 16 is compressed until the free right-hand ends of the partial shafts 6, 7 assume a position in front of the open ends of the bearing blocks 12, 13 respectively. From this condition, the wind deflector blade 1 together with the pivot bearing portion mounted on it is displaced crosswise to the pivot axis C in front of the apertures in the bearing blocks 12, 13 and as soon as these pivot bearing portions are aligned with one another, the wind deflector blade 1 is released and by reason of the spring force of the pre-compressed coil spring 16, the partial shafts 6 and 7 enter the bearing blocks 12 and 13 so that the bearing is ready for use.

Removal takes place by reversing the sequence, according to FIGS. 4 to 2, whereby when removal commences, it is only necessary to push the wind deflector blade 1 together with the partial shafts 6, 7 provided on it leftwards in the direction of the pivot axis C in FIGS. 2 to 5 until the partial shafts 6, 7 emerge from the bearing blocks 12, 13.

The wind deflector described hereinabove is as a whole, in the same way as the roof frame and the pivot bearing portions provided thereon, preferably formed from synthetic resin. Alternatively, a construction from metal or sheet metal parts can be considered.

As can be seen in FIGS. 1 and 5, the coil spring 16 is formed as a leg spring with leg ends, whereby only one of the two legs 21 can be seen and is biased on the wind deflector 1 while the other leg, not shown, is in per se known manner biased on the roof frame 3 in order to allow a spring-controlled upwards pivoting of the wind deflector blade 1 into its operative position. Therefore, the spring 16 acquires a dual role as an axial protection for the partial shafts 6, 7 and as an actuating member for the automatic outwards pivoting of the wind deflector blade 1 when the sliding roof is opened.

An embodiment of the present invention has been described with particular reference to the example illustrated. However, it will be appreciated that variations and modifications may be made to the example described within the scope of the present invention.

For example, whereas in the case of the preferred above-explained embodiment the partial bearing shafts are provided on the wind deflector while the bearing blocks for them are provided on the roof frame, the same purpose can also be achieved if the arrangement is reversed, namely with the bearing blocks on the wind deflector blade and the partial shafts are on the roof frame.

We claim:

1. A wind deflector for reducing noise at a vehicle roof opening, the deflector comprising: at least one wind deflector blade pivotally mounted by means of a pivot bearing for pivoting about a pivot axis, the pivot bearing comprising at least aligned first and second partial bearing shafts which are spaced apart axially on a longitudinal edge of the at least one wind deflector blade for mounting in first and second bearing blocks which are constructed for fixing to a vehicle roof and which are open at one axial end for axial insertion of the partial bearing shafts and closed at an opposite end for axial supporting of an end of the partial shafts; and biasing means between the first and second partial bearing shafts which, at one end, is mounted on a first housing constructed for fixing to a vehicle roof in a region of the first partial shaft, and at the opposite end, is mounted on a second housing in a region of the second partial shaft.

2. The wind deflector according to claim 1, wherein the first housing is provided at the closed end of the first bearing block for the first partial bearing shaft and the second housing is formed on the second partial bearing shaft which is mounted in the second bearing block.

3. The wind deflector according to claim 1, wherein the housings comprise aligned and axially spaced apart guide journals for the ends of the biasing means and radial supporting surfaces against which the ends of the biasing means are axially biased.

4. The wind deflector according to claim 3, wherein the guide journals extend in alignment with the partial shafts.

5. The wind deflector according to claim 3, wherein the radial supporting surface on the first guide journal is formed by the outside of the closed end of the first bearing block.

6. The wind deflector according to claim 3, wherein the second partial shaft and the second guide journal form a common shaft on which there is a ring or step which forms the radial supporting surface of the second guide journal.

7. The wind deflector according to claim 1, wherein the bearing blocks are respectively formed from two axially offset radially divided bearing shells.

8. The wind deflector according to claim 1, wherein the biasing means is a coil spring.

9. The wind deflector according to claim 8, wherein the coil spring is formed as a leg spring, one leg of which is constructed for engaging at one end on the roof while another leg of the leg spring is biased on the at least one wind deflector blade for pre-compressing the leg spring in the direction of an actuation of the wind deflector blade in an outwardly pivoted working position.

10. The wind deflector according to claim 1, wherein the partial hearing shafts and the housings are formed in one piece with the at least one wind deflector blade.

11. A vehicle roof having a fixed roof surface with a roof opening therein and a wind deflector for reducing noise at the roof opening, the wind deflector comprising: at least one wind deflector blade pivotally mounted by means of a pivot bearing for pivoting about a pivot axis, the pivot bearing comprising at least aligned first and second partial bearing shafts which are spaced apart axially on a longitudinal edge of the wind deflector blade for mounting in bearing blocks which are fixed to the fixed roof surface and which are open at one axial end for axial insertion of the partial bearing shafts and closed at an opposite end for axial supporting of an end of the partial bearing shafts; and biasing means between the two partial shafts which, at one end, is mounted on a first housing fixed to the fixed roof surface in a region of the first partial bearing shaft, and at the opposite end, is mounted on a second housing in a region of the second partial bearing shaft.

12. The vehicle roof according to claim 11, wherein the bearing blocks are formed in one piece with a roof frame mounted to the fixed roof surface at a peripheral area of the roof opening.

* * * * *